UNITED STATES PATENT OFFICE.

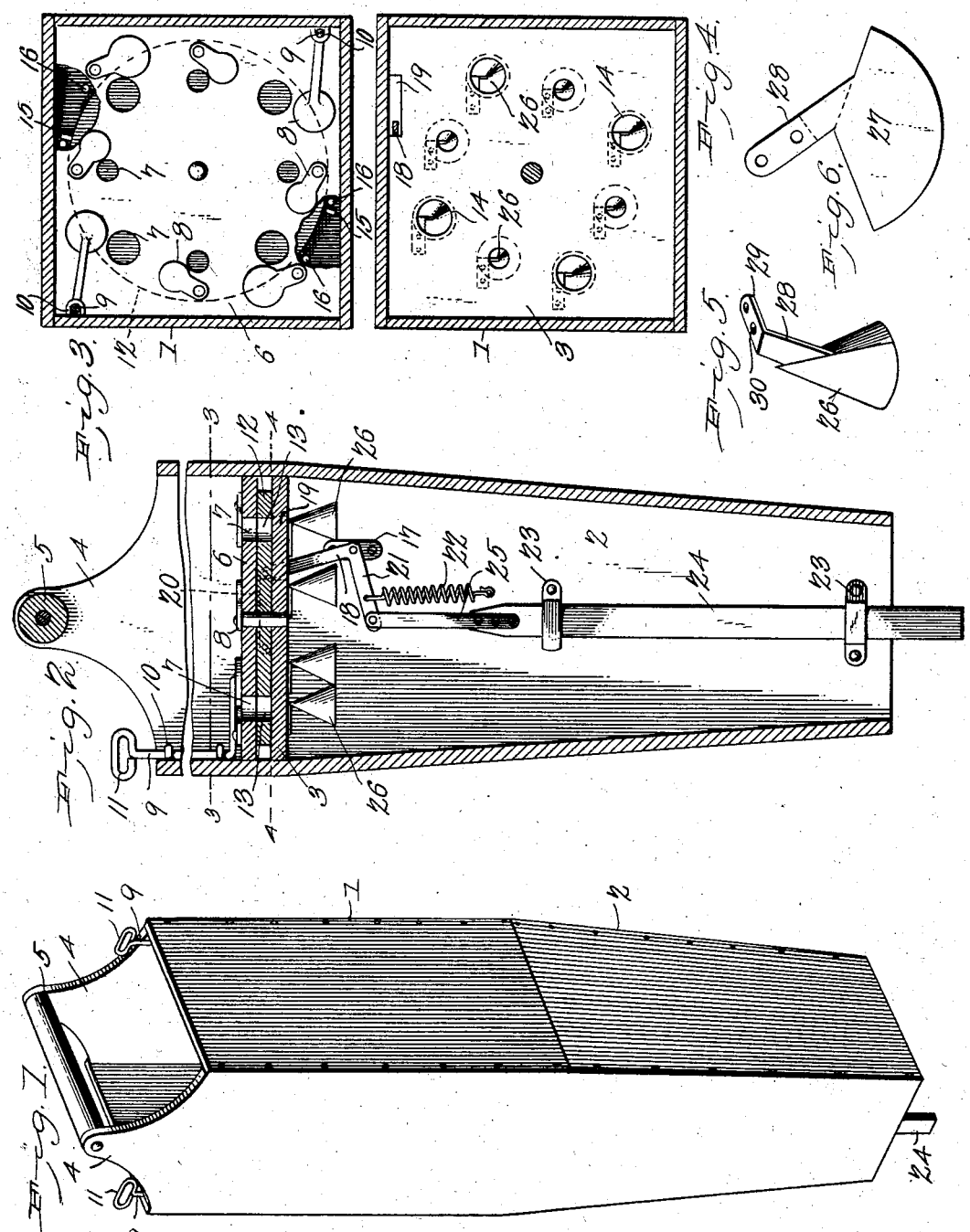

FRANCIS L. ATWOOD, OF SHADYGROVE, KENTUCKY.

FERTILIZER-DISTRIBUTER.

SPECIFICATION forming part of Letters Patent No. 721,272, dated February 24, 1903.

Application filed November 13, 1902. Serial No. 131,246. (No model.)

*To all whom it may concern:*

Be it known that I, FRANCIS L. ATWOOD, a citizen of the United States, residing at Shadygrove, in the county of Crittenden and State of Kentucky, have invented a new and useful Fertilizer-Distributer, of which the following is a specification.

This invention relates to that class of fertilizer-distributers which are carried and operated by hand for the purpose of depositing the fertilizing material in the exact spots where its presence is required; and it has for its object to provide a device of the class which shall possess superior advantages in point of simplicity, durability, and general efficiency, which shall be light, so as to be easily carried, which shall be so arranged that the exact quantity of fertilizing material required may be deposited at each operation, in which the gradation of quantity may be easily, swiftly, and accurately adjusted, and the simplicity of the construction of which shall be such as to render it not liable to get out of order by reason of continued use.

With these and other objects in view my invention consists in the improved construction, arrangement, and combination of parts, which will be hereinafter fully described, and particularly pointed out in the claims.

In the accompanying drawings, Figure 1 is a perspective view of a fertilizer-distributer constructed in accordance with my invention. Fig. 2 is a vertical sectional view of the same. Fig. 3 is a sectional plan view taken on the line 3 3 in Fig. 2. Fig. 4 is a sectional plan taken on the line 4 4 in Fig. 2. Fig. 5 is a perspective detail view of one of the conical spreaders. Fig. 6 is a detail plan of the blank from which said spreaders are manufactured.

Corresponding parts in the several figures are indicated by similar numerals of reference.

The body of my improved fertilizer-distributer is a box the upper part of which constitutes the hopper 1 and the lower part the distributing-chamber 2, the said hopper and distributing-chamber being separated by a partition 3. The top compartment 1 is preferably square in cross-section, while the distributing-chamber is tapered toward its lower end, as will be clearly seen in Figs. 1 and 2 of the drawings. The sides of the hopper are extended upwardly to form brackets 4, connected by a handle 5, by means of which the device may be conveniently carried by the operator.

A partition 6, arranged a short distance above the partition 3, constitutes the bottom of the hopper, which is provided with a plurality of perforations 7, which, as seen in Fig. 3 of the drawings, may be of varying sizes. These perforations constitute the measuring-cups for the fertilizing material, and adjacent to each perforation is a pivoted slide 8, which when desired may be disposed over the perforation so as to cover the same and form a temporary cut-off. Several of the slides are provided with upwardly-extending arms 9, having bearings in staples 10 upon the inner walls of the hopper-chamber and extended above the upper edge of the latter, where they are provided with handles 11, by means of which they may be manipulated, so as to regulate the capacity of the device while the hopper is filled with fertilizing material. This feature will be found to be a great convenience in enabling the operator to gage the quantity of each deposit while the machine is being used.

Pivotally supported upon the partition 3, below the bottom of the hopper, is the cut-off disk 12, which is provided with a plurality of perforations 13, which correspond in size and location with the perforations 7 in the bottom of the hopper with which they are normally in alinement. The partition-plate 3 is likewise provided with perforations 14 of sizes corresponding to that of the perforations 7 and 14, but disposed intermediately between the former, so that by oscillating the cut-off disk the perforations 13 of the latter may be brought into alinement with the said perforations 14 in the partition-plate 3. The cut-off disk is provided with radially-extending pins 15, adapted to engage stops 16, between the bottom of the hopper and the partition 3, to limit the oscillation of the cut-off disk, as will be readily understood.

Suitably secured to one of the inner walls of the distributing-chamber 2 is a bearing-plate 17, to which is pivoted a bell-crank lever, the upper arm of which, 18, extends through a slot 19 in the partition 3 and is connected with the oscillating cut-off disk by means of a link 20. The lower arm 21 of the bell-crank lever is connected by a retracting-spring 22 with the side of the casing. The latter is provided with brackets 23, supporting a vertically-movable slide 24, which extends below the lower edge of the casing and the upper end of which is connected by an arm 25 with the free end of the lower arm of the bell-crank lever. It will be understood that by forcing or moving the slide 24 in an upward direction the bell-crank lever will be operated against the tension of the retracting-spring, thus oscillating the cut-off disk upon its pivot. When the upward pressure upon the slide is discontinued, the tension of the retracting-spring will restore the parts to normal position.

On the under side of the partition 3, below each of the openings 14, spreading-cones 26 are arranged, as seen in Figs. 2 and 4. These spreading-cones are constructed of sheet metal in a manner which will be readily understood by reference to Figs. 5 and 6 of the drawings, each cone embodying in its construction a sector-shaped blank 27, having an arm 28 extending from one of its sides, as shown. When the sector-shaped blank is bent to form the cone 26, the arm 28 will extend above the apex of the cone and may then be bent so as to form a bracket 29, which is perforated, as at 30, to receive the pins or tacks whereby the said cone is supported in position upon the under side of the partition. These conical spreaders, which may be constructed and applied at a trifling expense, serve to loosen and scatter the fertilizing material as it escapes through the openings in the partition 3.

The operation of this device and its advantages will be readily understood from the foregoing description, taken in connection with the drawings hereto annexed. The material to be distributed is placed in the hopper, one or more of the perforations in the bottom of the latter having been previously closed by means of the slides 8 in case it shall be desired to work the device at less than its full capacity. A cover may be provided for the hopper; but this is not deemed necessary. As the operator carrying the device by the handle 5 progresses over the field he presses the device downwardly at the points where it is desired to deposit the fertilizing material. The upward movement of the slide 24 thus caused serves to operate the bell-crank lever against the tension of the spring 22, thus oscillating the cut-off disk 12, the perforations 13 in which have become filled, by gravity, with a portion of the contents of the hopper through the openings or cups 7, with which the perforations 13 are normally in alinement. The oscillating movement of the disk carries the perforations 13 into alinement with the discharge-openings 14, thus causing their contents to drop upon the spreading-cones 26 and thence down through the distributing-chamber upon the ground. It will be observed that the walls of the distributing-chamber afford a complete protection against the wind, which might otherwise carry away a portion of the fertilizing material from the spot where it is desired to deposit it. As soon as the downward pressure upon the casing is relaxed the tension of the retracting-spring restores the slide 24 and the bell-crank lever, as well as the oscillating disk 12, to normal position at which the perforations in said disk are in alinement with the perforations in the bottom of the hopper. Those of the cut-off slides 8 which are provided with upward-extending handles may be manipulated at any time to gage the quantity of each deposit.

While I have in the foregoing described a preferred construction of my invention, I desire it to be understood that I do not limit myself either with regard to structural details, relative proportions, or material used in the manufacture of the device, but reserve the right to any changes and modifications which may be resorted to without departing from the spirit or scope of my invention or sacrificing the utility of the same.

Having thus described my invention, I claim—

1. In a device of the class described, a casing comprising a hopper and a distributing-chamber, the latter tapered toward its lower end, partitions, spaced apart, at the upper end of the distributing-chamber and the lower end of the hopper, said partitions being provided with staggered perforations, an oscillating cut-off disk pivotally mounted between said partitions and having perforations disposed to aline with those in either partition, check pins and stops to limit the oscillation of the cut-off disk, a bell-crank lever pivoted to an inner wall of the distributing-chamber and extending through a slot in the lower partition, a link connecting the upper end of said bell-crank lever with the oscillating cut-off disk, a retracting-spring connecting the lower arm of said bell-crank lever with the wall of the distributing-chamber and a vertically-movable slide pivotally connected at its upper end with the lower arm of the bell-crank lever and having its lower end extended below the lower edge of the distributing-chamber.

2. In a device of the class described, a casing, partitions spaced apart within the same and having staggered perforations, a cut-off disk supported pivotally between said partitions, means for oscillating said cut-off disk, means for limiting the extent of the movement of said disk and individual slides disposed adjacent to the perforations in the upper partition.

3. In a device of the class described, a hopper having a bottom provided with a plurality of perforations forming discharge-cups, and slides disposed adjacent to each of said cups for closing the same, one or more of said slides being provided with upward-extending arms having operating-handles.

4. In a device of the class described, a casing having a perforated partition and means for intermittently dropping fertilizing material from a superimposed hopper through the perforations in said partition, in combination with spreading-cones supported upon the under side of said partition, one beneath each perforation and in the path of the material discharged therefrom.

5. In a device of the class described, a speading-cone composed of a sector-shaped blank having an arm extending from one of the sides thereof, to form a supporting-bracket.

In testimony that I claim the foregoing as my own I have hereto affixed my signature in the presence of two witnesses.

FRANCIS L. ATWOOD.

Witnesses:
 E. R. YOST,
 J. B. SIMPSON.